(12) United States Patent
Iwasaki

(10) Patent No.: US 10,199,645 B2
(45) Date of Patent: Feb. 5, 2019

(54) PRODUCING METHOD FOR COMPOSITE ACTIVE MATERIAL

(71) Applicant: TOYOTA JIDOSHA KABUSHIKI KAISHA, Toyota-shi, Aichi-ken (JP)

(72) Inventor: Masahiro Iwasaki, Nagoya (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/418,105

(22) Filed: Jan. 27, 2017

(65) Prior Publication Data

US 2017/0250403 A1 Aug. 31, 2017

(30) Foreign Application Priority Data

Feb. 26, 2016 (JP) ................................. 2016-036389

(51) Int. Cl.
| | |
|---|---|
| *B05D 5/12* | (2006.01) |
| *H01M 4/36* | (2006.01) |
| *H01M 4/04* | (2006.01) |
| *H01M 4/131* | (2010.01) |
| *H01M 4/1391* | (2010.01) |
| *H01M 10/0525* | (2010.01) |

(Continued)

(52) U.S. Cl.
CPC ......... *H01M 4/366* (2013.01); *H01M 4/0402* (2013.01); *H01M 4/043* (2013.01); *H01M 4/0471* (2013.01); *H01M 4/131* (2013.01); *H01M 4/1391* (2013.01); *H01M 10/0525* (2013.01); *H01M 10/0562* (2013.01); *H01M 4/505* (2013.01); *H01M 4/525* (2013.01); *H01M 2004/028* (2013.01); *H01M 2300/0094* (2013.01)

(58) Field of Classification Search
CPC combination set(s) only.
See application file for complete search history.

(56) References Cited

U.S. PATENT DOCUMENTS

2009/0267028 A1* 10/2009 Hoshiba ................ H01G 11/38
252/500
2010/0047691 A1* 2/2010 Kawakami ............ H01M 4/366
429/221

(Continued)

FOREIGN PATENT DOCUMENTS

CN 101070149 A 11/2007
CN 105261745 A 1/2016

(Continued)

*Primary Examiner* — Austin Murata
(74) *Attorney, Agent, or Firm* — Dickinson Wright, PLLC

(57) ABSTRACT

The present disclosure provides a method for producing a composite active material with the capability of improving coating efficiency. The present disclosure achieves an object by providing a method for producing a composite active material having an oxide active material, an oxide solid electrolyte layer that coats a surface of the oxide active material, and a sulfide solid electrolyte layer that coats a surface of the oxide solid electrolyte layer, where the method comprises a coating step of forming the sulfide solid electrolyte layer by conducting a mixing treatment such that a sulfide solid electrolyte material is mixed with the oxide active material coated with the oxide solid electrolyte layer while plastically deforming the sulfide solid electrolyte material, under a pressure decompressed to less than an atmospheric pressure.

15 Claims, 2 Drawing Sheets

(51) Int. Cl.
*H01M 10/0562* (2010.01)
*H01M 4/505* (2010.01)
*H01M 4/525* (2010.01)
*H01M 4/02* (2006.01)

(56) References Cited

U.S. PATENT DOCUMENTS

| | | | | |
|---|---|---|---|---|
| 2011/0049745 | A1* | 3/2011 | Katayama | H01M 10/0562 264/104 |
| 2014/0287324 | A1* | 9/2014 | Tsuchida | H01M 4/366 429/304 |
| 2015/0171421 | A1* | 6/2015 | Akikusa | H01M 4/131 429/217 |
| 2015/0340681 | A1 | 11/2015 | Iwasaki et al. | |
| 2016/0013479 | A1 | 1/2016 | Iwasaki | |
| 2016/0149259 | A1* | 5/2016 | Osada | H01M 10/0562 429/323 |

FOREIGN PATENT DOCUMENTS

| | | |
|---|---|---|
| JP | 2014-022074 A | 2/2014 |
| JP | 2014-154406 A | 8/2014 |
| JP | 2014-154407 A | 8/2014 |
| JP | 2016-18735 A | 1/2016 |
| WO | WO 2014-122520 A1 | 8/2014 |
| WO | WO 2014/208239 * | 12/2014 |

\* cited by examiner

PRODUCING METHOD FOR COMPOSITE ACTIVE MATERIAL

RELATED APPLICATIONS

This application claims priority to Japanese Application No. 2016-036389, filed Feb. 26, 2016, which is hereby incorporated by reference in its entirety.

TECHNICAL FIELD

The present disclosure relates to a method for producing a composite active material in which the efficiency in coating with a sulfide solid electrolyte layer may be improved.

BACKGROUND ART

In accordance with a rapid spread of information related apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery is of interest from the viewpoint of a high energy density compared to other kinds of batteries.

A liquid electrolyte including a flammable organic solvent is used for a conventional commercial lithium battery, so that the installation of a safety device for restraining temperature rise during a short circuit and the structure for preventing the short circuit are necessary therefor. In contrast, a solid state battery such that the liquid electrolyte is replaced with a solid electrolyte layer to provide an all solidify the battery is conceived to simplify the safety device and improve production cost and productivity where the flammable organic solvent is not used in the battery.

In all solid batteries, solid electrode materials (such as active materials, solid electrolytes, and conductive materials) are formed with electrode bodies, so that it is important the materials are adhered to each other in the constitution. For example, Patent Literature 1 discloses a production of a composite active material in which a sulfide solid electrolyte material is mixed with an oxide active material coated with an oxide solid electrolyte layer while applying energy to plastically deform the sulfide solid electrolyte material, so as to form a sulfide solid electrolyte layer on the oxide active material. An object of Patent Literature 1 is to reduce the reaction resistance in batteries. Patent Literature 2 discloses mixing a sulfide solid electrolyte material with an oxide active material coated with an oxide solid electrolyte layer for 10 minutes while adjusting the temperature to 100° C. or less and applying energy to plastically deform the sulfide solid electrolyte material, so as to bring the BET specific surface area of a composite active material to be less than 2.82 $m^2/g$. Patent Literature 3 discloses a technique of forming a coating layer including a sulfide solid electrolyte material in the surface of an active material by conducting a rotation and revolution mixing treatment with respect to a raw material composition including an active material and a sulfide solid electrolyte material. An object of Patent Literature 3 is to form the coating layer while restraining the damage to the active material surface.

CITATION LIST

Patent Literatures

Patent Literature 1: Japanese Patent Application Laid-Open (JP-A) No. 2014-154407
Patent Literature 2: JP-A No. 2014-154406
Patent Literature 3: JP-A No. 2014-022074

SUMMARY OF DISCLOSURE

Technical Problem

The above-described Patent Literatures 1 and 2 disclose a method for forming a sulfide solid electrolyte layer by conducting a mixing treatment such that a sulfide solid electrolyte material is mixed with an oxide active material that is coated with an oxide solid electrolyte layer while plastically deforming the sulfide solid electrolyte material under an atmospheric pressure. In recent years, in a method for producing a composite active material, further improvement of efficiency in coating with a sulfide solid electrolyte layer has been desired.

The present disclosure has been made in view of the actual circumstances, and the main object thereof is to provide a producing method for a composite active material in which the efficiency in coating with a sulfide solid electrolyte layer may be improved.

Solution to Problem

In order to achieve the object, the present disclosure provides a method for producing a composite active material having an oxide active material, an oxide solid electrolyte layer that coats a surface of the oxide active material, and a sulfide solid electrolyte layer that coats a surface of the oxide solid electrolyte layer, and the method comprising a coating step of forming the sulfide solid electrolyte layer by conducting a mixing treatment such that a sulfide solid electrolyte material is mixed with the oxide active material coated with the oxide solid electrolyte layer while plastically deforming the sulfide solid electrolyte material, under a pressure decompressed to less than an atmospheric pressure.

According to the present disclosure, efficiency in coating with a sulfide solid electrolyte layer may be improved by conducting the mixing treatment such that the sulfide solid electrolyte material is mixed with the oxide active material coated with the oxide solid electrolyte layer while plastically deforming the sulfide solid electrolyte material, under a pressure decompressed to less than an atmospheric pressure.

In the present disclosure, the pressure decompressed to less than an atmospheric pressure is preferably 100 Pa or less.

In the present disclosure, the mixing treatment while plastically deforming the sulfide solid electrolyte material is preferably a compression shearing treatment using a rotation blade.

Advantageous Effects of Disclosure

The present disclosure produces the effect that allows improvement of efficiency in coating with a sulfide solid electrolyte layer in a composite active material.

DESCRIPTION OF EMBODIMENTS

A producing method for a composite active material of the present disclosure is hereinafter described in details.

Figure 1:
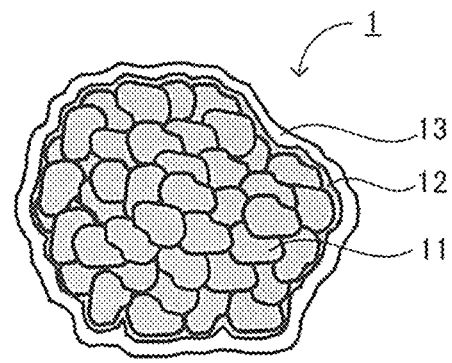
FIG. 1 is a schematic cross-sectional view illustrating an example of a composite active material to be obtained by the method of the present disclosure.
Figure 2A:
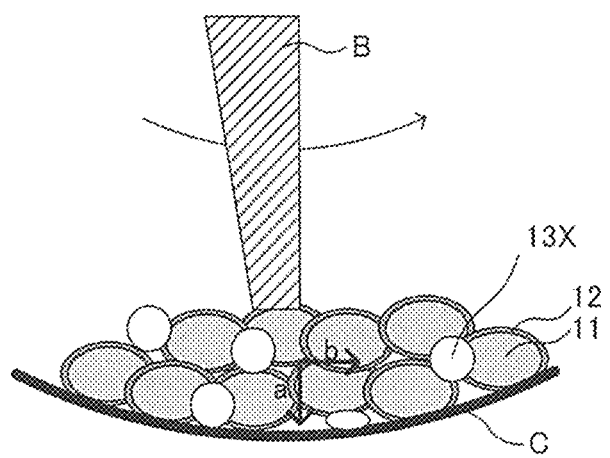
FIGS. 2A and 2B are schematic diagrams illustrating an example of a method for producing a composite active material of the present disclosure.
Figure 2B:
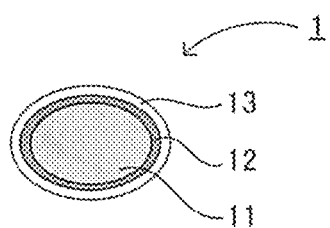

FIG. 1 is a schematic cross-sectional view illustrating an example of a composite active material to be obtained by a producing method of the present disclosure. Composite active material 1 shown in FIG. 1 comprises oxide active material 11, oxide solid electrolyte layer 12 that coats the surface of oxide active material 11, and sulfide solid electrolyte layer 13 that coats the surface of oxide solid electrolyte layer 12. FIGS. 2A and 2B are schematic diagrams illustrating an example of a method for producing a composite active material of the present disclosure. In the method shown in FIGS. 2A and 2B, and as shown in FIG. 2A, sulfide solid electrolyte material 13X is mixed with oxide active material 11 coated with oxide solid electrolyte layer 12 while plastically deforming sulfide solid electrolyte material 13X, under a pressure decompressed to less than an atmospheric pressure (a coating step). FIG. 2A shows an example of applying a compression shearing treatment using a rotation blade. In FIG. 2A, the compression shearing energy is applied to oxide active material 11 coated with oxide solid electrolyte layer 12, and to sulfide solid electrolyte material 13X, that are between blade B and vessel C. In particular, compression energy "a" is applied to a normal direction of the rotation of blade B, and shearing energy "b" is applied to a tangential direction of the rotation of blade B. By such treatment, as shown in FIG. 2B, sulfide solid electrolyte layer 13 may be formed and composite active material 1 may be produced.

According to the present disclosure, the sulfide solid electrolyte material is mixed with the oxide active material while plastically deforming the sulfide solid electrolyte material, under a pressure decompressed to less than an atmospheric pressure, so that the efficiency in coating with a sulfide solid electrolyte layer may be improved. Here, the improvement in coating efficiency may include an improvement in the coverage and improvement in the treatment efficiency. Regarding the improvement in the coverage, specifically, when the treatments are conducted in the same conditions except for the pressure, the coverage of a sulfide solid electrolyte layer may be increased by the treatment pressure below atmospheric pressure compared with under atmospheric pressure. Also, in conventional methods (treatments under atmospheric pressure), to improve the coverage (to exceed 95% for example), it is necessary to fill in the surface area not covered with the sulfide solid electrolyte layer by thickening a sulfide solid electrolyte layer in the manner such as to take more time for the treatment. Accordingly, usage of the composite active material has a peculiar problem such that the resistance inside the battery is increased. In contrast, under decompressed pressure below atmospheric pressure, the thickness of a sulfide solid electrolyte layer may be reduced even when the coverage is increased, and thus the resistance inside the battery may be decreased.

Regarding the improvement in treatment efficiency, specifically, when the coverage of sulfide solid electrolyte layers are adjusted to a similar extent, the necessary energy may be smaller for the treatment under decompressed pressure below atmospheric pressure, compared with under atmospheric pressure, so that the damage to the active material may be decreased. As an example, blade rotation speed may be decreased when conducting a compression shearing treatment using a rotation blade.

Above-described Patent Literature 1 and 2 disclose a forming method for the sulfide solid electrolyte layer by conducting a mix treatment such that a sulfide solid electrolyte material is mixed with an oxide active material coated with an oxide solid electrolyte layer while plastically deforming the sulfide solid electrolyte material, under an atmospheric pressure. The sulfide solid electrolyte layer is presumed to be formed by the following phenomenon.

An oxide active material and an oxide solid electrolyte layer formed on the oxide active material surface are usually firm and thus not plastically deformed. On the other hand, a sulfide solid electrolyte material is usually softer than the oxide active material and oxide solid electrolyte material, and thus easier to plastically deform. Accordingly, when friction and shearing energy (such as compression shearing energy) is applied by the compression shearing treatment, the soft sulfide solid electrolyte material is plastically deformed and adhered to the firm oxide solid electrolyte layer surface. As a result, the sulfide solid electrolyte layer is formed. However, if the treatment is conducted under an atmospheric pressure such as in Patent Literatures 1 and 2, adhesion of the sulfide solid electrolyte material to the oxide solid electrolyte layer may possibly be inhibited by the air present in between the oxide solid electrolyte layer and sulfide solid electrolyte material.

In contrast, in the present disclosure, a sulfide solid electrolyte material is mixed with an oxide active material coated with an oxide solid electrolyte layer under a pressure decompressed to less than an atmospheric pressure, so that the air between the oxide solid electrolyte layer and sulfide solid electrolyte material may be decreased. Accordingly, the friction and shearing energy to be applied to both may be improved. As the result, the sulfide solid electrolyte material is easily adhered to the surface of the oxide solid electrolyte layer. It is presumed that the coverage of the sulfide solid electrolyte layer is increased thereby.

A method for producing a composite active material of the present disclosure such as a coating step is hereinafter described in details.

1. Coating Step

A coating step in the present disclosure is a step of forming a sulfide solid electrolyte layer by conducting a mixing treatment such that a sulfide solid electrolyte material is mixed with a oxide active material coated with an oxide solid electrolyte layer while plastically deforming the sulfide solid electrolyte material, under a pressure that is less than an atmospheric pressure.

(1) Oxide Active Material

An oxide active material in the present disclosure is not particularly limited, but preferably contains a Li element, a transition metal element, and an O element. In particular, the oxide active material preferably contains a Li element, a transition metal element, and an O element mainly. The total proportion of the Li element, the transition metal element, and the O element, in the entire elements that constitute the oxide active material is: 50 mol % or more for example, preferably 70 mol % or more, and more preferably 90 mol % or more. Also, examples of the transition metal element may include Co, Ni, Mn, V, Ti, Fe, and Si. Above all, the oxide active material preferably contains at least one selected from the group consisting of Co, Ni, and Mn as the transition metal element.

Examples of the oxide active material may include a Li-containing transition metal oxide represented by a general formula $Li_xM_yO_z$ (M is a transition metal element, x=0.02 to 2.2, y=1 to 2, and z=1.4 to 4). Specific examples thereof may include a rock salt bed type active material such as $LiVO_2$ and one represented by a general formula $LiNi_x$-$Mn_yCo_zO_2$ (x≥0, y≥0, z≥0, and x+y+z=1) (such as $LiCoO_2$, $LiMnO_2$, $LiNiO_2$, and $LiNi_{1/3}Co_{1/3}Mn_{1/3}O_2$), a spinel type active material such as $LiMn_2O_4$, $Li_4Ti_5O_{12}$, and $Li(Ni_{0.5}Mn_{1.5})O_4$, an olivine type active material (lithium metal phosphate) such as $LiFePO_4$, $LiMnPO_4$, $LiNiPO_4$, and $LiCoPO_4$, a ramsdellite type active material such as $Li_2Ti_3O_7$, and a $Li_2MnO_3$-including solid solution type active material.

Also, other than the oxide active material represented by the general formula $Li_xM_yO_z$, for example, different kinds of element substituents Li—Mn spinel represented by a general formula $Li_{1+x}Mn_{2-x-y}M_yO_4$ (x and y is an arbitrary real number, and M is at least one kind or more of Al, Mg, Co, Fe, Ni, and Zn), and lithium titanate represented by a general formula $Li_xTiO_y$ (x and y is an arbitrary real number) may be used as the transition metal oxide. Also, for example, NASICON type active material such as $Li_3V_2P_3O_{12}$ may be used, and $V_2O_5$ (vanadium oxide) and $MoO_3$ (molybdenum oxide) may be used.

Examples of the shape of the oxide active material may include a granular shape. The particle of the oxide active material may be a primary particle, and may be a secondary particle. The average particle diameter of the oxide active material ($D_{50}$) is in a range of 0.1 mm to 50 mm for example. The average particle diameter may be measured by a dry particle distribution meter, for example.

The mass ratio of the oxide active material to be mixed in the coating step with respect to the mass of a composite active material is: in a range of 10 mass % to 99 mass % for example, and preferably in a range of 20 mass % to 90 mass %. If the ratio of the oxide active material is small, the performance of the composite active material may be deteriorated.

(2) Oxide Solid Electrolyte Layer

The oxide solid electrolyte layer in the present disclosure contains an oxide solid electrolyte material, and usually coats a partial or whole surface of the oxide active material. The oxide solid electrolyte layer has a function to restrain the reaction of the oxide active material with the sulfide solid electrolyte layer.

Examples of the oxide solid electrolyte material to be used for the oxide solid electrolyte layer may include a material represented by a general formula $Li_xMO_y$ (x and y is an integral number, and M is at least one kind or more of B, C, Al, Si, P, S, Ti, Zr, Nb, Mo, Ta, and W). Specific examples thereof may include $LiNbO_3$, $Li_3BO_3$, $LiBO_2$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $Li_2MoO_4$, $Li_2WO_4$, and an arbitrary composite oxide of these. It is preferable that the oxide solid electrolyte material is high in Li ion conductivity.

The thickness of the oxide solid electrolyte layer is preferably 0.1 nm or more for example, more preferably 1 nm or more, and particularly preferably 7 nm or more. Also, the thickness of the oxide solid electrolyte layer is preferably 100 nm or less for example, more preferably 20 nm or less, and particularly preferably 15 nm or less. Incidentally, the thickness of the oxide solid electrolyte layer is the average thickness.

The coverage of the oxide solid electrolyte layer on the surface of the oxide active material is: preferably 80% or more for example, more preferably 90% or more, and particularly preferably 95% or more. The oxide solid electrolyte layer may coat the whole surface of the oxide active material. The coverage of the oxide solid electrolyte layer is preferably high.

(3) Sulfide Solid Electrolyte Material

Sulfide solid electrolyte materials are used to form sulfide solid electrolyte layers in composite active materials. Examples of the sulfide solid electrolyte material may include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (provided that m and n is a positive number; Z is either one of Ge, Zn, and Ga), $Li_2S$—$GeS_2$, $Li_2S$—$SiS_2$—$Li_3PO_4$, $Li_2S$—$SiS_2$—$Li_xMO_y$ (provided that x and y is a positive number; M is either one of P, Si, Ge, B, Al, Ga, and In), and $Li_{10}GeP_2S_{12}$. It is preferable that the sulfide solid electrolyte material is high in Li ion conductivity.

In particular, the sulfide solid electrolyte material is preferably provided with an ion conductor that contains Li, A (A is at least one kind of P, Si, Ge, Al, and B), and S. Further, the ion conductor preferably has an anion structure of an ortho composition ($PS_4^{3-}$ structure, $SiS_4^{4-}$ structure, $GeS_4^{4-}$ structure, $AlS_3^{3-}$ structure, and $BS_3^{3-}$ structure) as the main component of the anion. The reason therefor is to allow the sulfide solid electrolyte material with high chemical stability. The proportion of the anion structure of the ortho composition with respect to the entire anion structures in an ion conductor is preferably 70 mol % or more and more preferably 90 mol % or more. The proportion of the anion structure of the ortho composition may be determined by Raman spectroscopy, NMR, and XPS for example.

The sulfide solid electrolyte material may or may not contain a lithium halide in addition to the ion conductor. Examples of the lithium halide may include LiF, LiCl, LiBr and LiI; above all, LiCl, LiBr and LiI are preferable. Respectively, LiF, LiCl, LiBr and LiI are preferably present in the state taken into the structure of the ion conductor as a LiF component, LiI component, LiBr component and LiCl component. In other words, the sulfide solid electrolyte material preferably contains the lithium halide as not in the simple mixture, but in the state physically not separable. The proportion of LiX (X=I, Cl, and Br) in the sulfide solid electrolyte material is in a range of 5 mol % to 30 mol % for example, and preferably in a range of 15 mol % to 25 mol %. The proportion of LiX refers to the total proportion of LiX contained in the sulfide solid electrolyte material.

The sulfide solid electrolyte material may be a crystalline material and may be an amorphous material. Also, the sulfide solid electrolyte material may be glass, and may be crystallized glass (glass ceramics). In the present disclosure, above all, ceramics is preferable.

The sulfide solid electrolyte material is in a granular shape for example. The average particle diameter ($D_{50}$) of the sulfide solid electrolyte material in a granular shape is 0.1 mm or more for example, may be 0.4 mm or more, and may be 0.8 mm or more. Also, the average particle diameter ($D_{50}$) of the sulfide solid electrolyte material is 1.5 mm or less for example, may be 1.4 mm or less, and may be 1.0 mm or less.

(4) Coating Step

In the present disclosure, a coating step is conducted under a pressure decompressed to less than an atmospheric pressure.

The level of decompression is not particularly limited if the pressure is less than an atmospheric pressure and allows the improvement of efficiency in coating with the sulfide solid electrolyte layer. For example, it may be low vacuum (in a range of 100 Pa to 50 kPa), may be middle vacuum (in a range of 0.1 Pa to 100 Pa), may be high vacuum (in a range of $10^{-5}$ Pa to 0.1 Pa), and may be extra high vacuum ($10^{-5}$ Pa or less). Above all, the pressure of medium vacuum or less, which is 100 Pa or less is preferable. The reason therefor is to allow the efficiency in coating with the sulfide solid electrolyte layer to be more favorable.

In the coating step, a sulfide solid electrolyte material is mixed with an oxide active material coated with an oxide solid electrolyte layer while plastically deforming the sulfide solid electrolyte material (a mix treatment). "Plastically deforming the sulfide solid electrolyte material" means that the sulfide solid electrolyte material cannot hold the original shape in the beginning stage of the coating step, and thus irreversibly flows. If the sulfide solid electrolyte material is a particle, the term means that the particles adjacent to each other are mixed as the result of getting out of the particle shape in the beginning stage, and thus at least a part of the grain boundary between the particles disappears. All the grain boundaries between the particles may disappear. Also, when the sulfide solid electrolyte material is plastically deformed, a chemical bond between atoms is usually not cut off, and thus the composition is not changed in quality.

Examples of the mixing treatment such that the sulfide solid electrolyte material is mixed while plastically deformed may include a compression shearing treatment using a rotation blade. In particular, the treatment is such that a compression shearing energy is applied to the mixture of the oxide active material and the sulfide solid electrolyte material between the blade and the wall surface of the vessel by rotating the blade by a rotor, for example, using a mechanical kneading method.

Also, a treatment by a mechanical kneading using a crushing medium (such as ball and beads) such as a ball mill and bead mill, and a rotation and revolution kneading treatment may be included as the other examples.

In the present disclosure, the treatment is more preferably a compression shearing treatment using a rotation blade. The compression shearing treatment using a rotation blade is typically a media-less treatment that does not utilizes a crushing medium (such as ball and beads). Accordingly, a mechanical and thermal damage to a composite active material may be reduced compared to a method using a crushing medium.

Examples of the compression shearing treatment apparatus may include a mechano-fusion system and a hybridization system. Specific examples thereof may include Nobilta™ (manufactured by Hosokawa Micron Corporation) and COMPOSI (manufactured by NIPPON COKE & ENGINEERING. CO., LTD.). Examples of the material for the blade may include ceramics, glass, and metal.

The compression shearing treatment may be a dry treatment or may be a wet treatment, but a dry treatment is preferable. The reason therefor is to allow the sulfide solid electrolyte layer to be formed while maintaining the composition ratio of the sulfide solid electrolyte material.

The blade rotation speed in the compression shearing treatment is 6 m/s or more for example, and may be 9 m/s or more. Also, the blade rotation speed is 20 m/s or less for example, may be 18 m/s or less, and may be 17 m/s or less. The blade rotation speed is the rotation speed of the outermost periphery of the blade disposed in the rotor.

The rotation number of the blade is appropriately adjusted in accordance with the diameter of the blade, but preferably in a range of 500 rpm to 5000 rpm for example, and more preferably in a range of 2500 rpm to 3000 rpm.

The distance between the blade and the inner wall is in a range of 0.1 mm to 8 mm for example, more preferably in a range of 0.2 mm to 5 mm, and particularly preferably in a range of 0.5 mm to 2 mm.

The treatment time of the compression shearing treatment is preferably 10 minutes or more for example, and above all, preferably 12 minutes or more. The treatment time is preferably 15 minutes or less for example, and particularly, preferably 13 minutes or less.

2. Producing Method for Composite Active Material

The method for producing the composite active material of the present disclosure is not particularly limited if it has the coating step; a necessary step may be appropriately selected and added. Specific examples of the step to be added may include a step of coating the surface of the oxide active material with an oxide solid electrolyte layer, and a step of producing a sulfide solid electrolyte material.

3. Composite Active Material

A composite active material to be obtained by the producing method of the present disclosure comprises an oxide active material, an oxide solid electrolyte layer, and a sulfide solid electrolyte layer.

The sulfide solid electrolyte layer contains a sulfide solid electrolyte material, and usually coats the surface of an oxide solid electrolyte layer. The sulfide solid electrolyte layer may be formed as the most outer layer of the composite active material, and another layer may be further formed on the surface of the sulfide solid electrolyte layer.

The specific surface area of the sulfide solid electrolyte layer is 1.06 $m^2/g$ or more for example, and may be 1.08 $m^2/g$ or more. Also, the specific surface area of the sulfide solid electrolyte layer is 1.22 $m^2/g$ or less for example, and may be 1.18 $m^2/g$ or less above all. The specific surface area of the sulfide solid electrolyte layer may be measured by a nitrogen adsorbing BET method.

Incidentally, the "specific surface area of a sulfide solid electrolyte layer" refers to a surface area of a sulfide solid electrolyte layer per unit weight of a composite active material. If the composite active material has another layer formed on the surface of the sulfide solid electrolyte layer, the specific surface area is calculated by setting the weight of the material excluding the other layer as the denominator.

The thickness of the sulfide solid electrolyte layer is 15 nm or more for example, and preferably 20 nm or more above all. Also, the thickness of the sulfide solid electrolyte layer is 25 nm or less for example, and preferably 24.5 nm or less above all. The thickness of the sulfide solid electrolyte layer is the average thickness. For example, it may be calculated as the average value measured by observation with a transmission electron microscope (TEM) (such as n 100).

The coverage of the sulfide solid electrolyte layer in the composite active material is preferably 90% or more for example, more preferably 95% or more, and particularly preferably 97% or more. Also, the coverage of the sulfide solid electrolyte layer may be 99% or less, for example. The coverage of the sulfide solid electrolyte layer may be measured by a transmission electron microscope (TEM) and X-ray photoelectron spectrometry (XPS), for example.

The composite active material is in a granular shape for example. The average particle diameter of the composite active material may be close to the average particle diameter of the above-described oxide active material.

The composite active material of the present disclosure is used for a cathode active material layer or anode active material layer of a solid battery, for example; and is preferably used for a lithium solid battery.

Incidentally, the present disclosure is not limited to the embodiments. The embodiments are exemplification, and any is included in the technical scope of the present disclosure if it has substantially the same constitution as the technical idea described in the claim of the present disclosure and offers similar operation and effect thereto.

EXAMPLES

The present disclosure is hereinafter described in further details with reference to examples.

Example 1

Production of Cathode Active Material

A cathode active material ($LiNi_{1/3}Co_{1/3}Mn_{1/3}O_2$ coated with $LiNbO_3$) was produced in the following manner.

Lithium nickel cobalt manganate ($LiNi_{1/3}Co_{1/3}Mn_{1/3}O_2$) was used for the active material. The active material was coated with lithium niobate ($LiNbO_3$) by a sol-gel method. In particular, the surface of the above-described active material was spray coated with a compound that was produced by dissolving equal molar amounts of $LiOC_2H_5$ and $Nb(OC_2H_5)_5$ in an ethanol solvent, by using a rolling flow coating apparatus (SFP-01™, manufactured by Powrex Corp.). After that, the coated active material was subjected to a heat treatment under an atmospheric pressure for 1 hour at 350° C., so as to form an oxide solid electrolyte layer ($LiNbO_3$, 10 nm thick, and the coverage being 99%). The cathode active material having the oxide solid electrolyte layer was produced in the above manner. The average particle diameter of the cathode active material was 6 mm.

Production of Sulfide Solid Electrolyte Material

A sulfide solid electrolyte material ($10LiI$-$15LiBr$-$75(0.75Li_2S$-$0.25P_2S_5)$) was produced in the following manner.

A lithium sulfide ($Li_2S$, manufactured by NIPPON CHEMICAL INDUSTRIAL CO., LTD.), lithium iodide (LiI, manufactured by NIPPON CHEMICAL INDUSTRIAL CO., LTD.), LiBr (manufactured by JAPAN PURE CHEMICAL CO., LTD.), and pentasulfide diphosphate ($P_2S_5$, manufactured by Sigma-Aldrich Japan K.K.) were used as the starting raw materials. Powders of these were mixed in a glove box under an argon atmosphere at the ratio of 0.7178 g of $Li_2S$, 0.3715 g of LiI, 0.5573 g of LiBr, and 1.1573 g of $P_2S_5$ so as to obtain the raw material composition. Next, the raw material composition was mixed by an agate motor for 5 minutes, thereafter put into a pot made of zirconia along with 4 g of dehydrated heptane. The pot was placed in a planetary ball milling machine and subjected to the mechanical milling at the plate rotation speed of 370 rpm for 40 hours. A sulfide solid electrolyte material ($10LiI$-$15LiBr$-$75(0.75Li_2S$-$0.25P_2S_5)$, a sulfide glass) was obtained in this manner. The average particle diameter of the sulfide solid electrolyte material was 0.5 mm.

Coating Treatment (Compression Shearing Treatment)

A compression shearing treatment was conducted by using a particle compositing apparatus (NOB-MINI™, manufactured by Hosokawa Micron Corporation). Placed into the treatment vessel were 40 g of the cathode active material and 8.2 g of the sulfide solid electrolyte material. The compression shearing treatment was conducted under the conditions of: pressure: 100 Pa, distance between the rotation feather (blade) of the compression shearing rotor and the inner wall of the treatment vessel: 1 mm, blade rotation speed: 6.6 m/s, and treatment time: 10 minutes, to obtain a composite active material.

Examples 2 to 5

A composite active material was obtained in the same manner as in Example 1 except for changing the blade rotation speed in the compression shearing treatment to be 9.9 m/s (Example 2), 13.2 m/s (Example 3), 16.5 m/s (Example 4), and 19.8 m/s (Example 5) respectively.

Comparative Example 1

Mixed by an agate motor for 10 minutes (by dry mixing) were 40 g of the cathode active material ($LiNi_{1/3}Co_{1/3}Mn_{1/3}O_2$ coated with $LiNbO_3$) and 8.2 g of the sulfide solid electrolyte material ($10LiI$-$15LiBr$-$75(0.75Li_2S$-$0.25P_2S_5)$); the dry-mixed material was used for Comparative Example 1.

Comparative Examples 2 to 6

A composite active material was obtained in the same manner as in Example 1 except that the compression shearing treatment was conducted under an atmospheric pressure, and the blade rotation speed was changed to 6.6 m/s (Comparative Example 2), 9.9 m/s (Comparative Example 3), 13.2 m/s (Comparative Example 4), 16.5 m/s (Comparative Example 5), and 19.8 m/s (Comparative Example 6) respectively.

[Evaluation]

(Measurement for Coverage of SE Layer)

The composite active materials produced in Examples 1 to 5 and Comparative Examples 1 to 6 were measured by XPS (X-ray photoelectron spectrometry) and the element ratio (ER) was calculated from the peak cross-sectional area of each element. The ratio of each element was inserted to the following formula so as to calculate the coverage of the sulfide solid electrolyte layer (SE layer). The result is shown in Table 1 and FIG. 3.

$$\text{Coverage (\%)} = (ER_P + ER_S + ER_I + ER_{Br})/(ER_{Mn} + ER_{Co} + ER_{Ni} + ER_{Nb} + ER_P + ER_S + ER_I + ER_{Br})$$

(In the formula, $ER_P$ represents the element composition ratio of a phosphate element, $ER_S$ represents the element composition ratio of a sulfur element, $ER_I$ represents the element composition ratio of an iodine element, $ER_{Br}$ represents the element composition ratio of a bromine element, $ER_{Mn}$ represents the element composition ratio of a manganese element, $ER_{Co}$ represents the element composition ratio of a cobalt element, $ER_{Ni}$ represents the element composition ratio of a nickel element, and $ER_{Nb}$ represents the element composition ratio of a niobium element, respectively.)

TABLE 1

| | Pressure | Blade rotation speed [m/s] | Coverage [%] |
|---|---|---|---|
| Example 1 | 100 Pa | 6.6 | 96 |
| Example 2 | | 9.9 | 97 |
| Example 3 | | 13.2 | 98 |
| Example 4 | | 16.5 | 99 |
| Example 5 | | 19.8 | 99 |
| Comparative Example 1 | Atmospheric pressure | 0 | 90 |
| Comparative Example 2 | | 6.6 | 94 |
| Comparative Example 3 | | 9.9 | 95 |
| Comparative Example 4 | | 13.2 | 95 |
| Comparative Example 5 | | 16.5 | 96 |
| Comparative Example 6 | | 19.8 | 97 |

Figure 3:
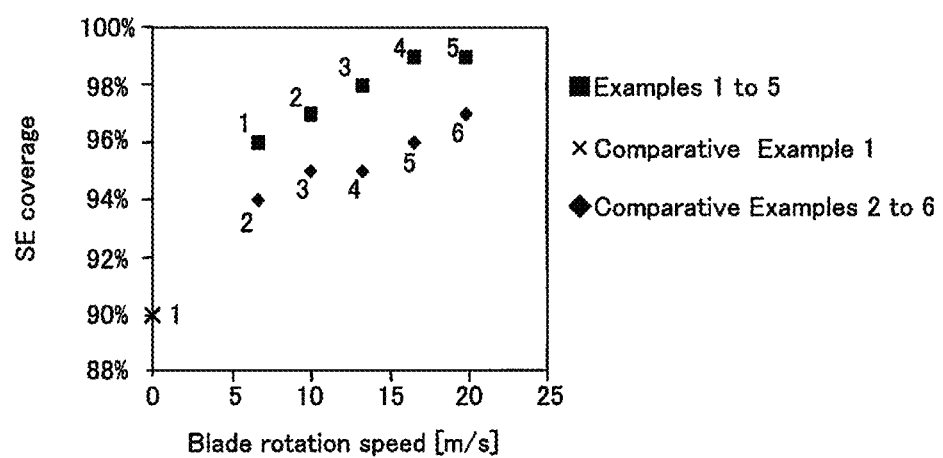
FIG. 3 shows the result of the blade rotation speed and SE coverage in Examples 1 to 5 and Comparative Examples 1 to 6.

As shown in Table 1 and FIG. 3, it was confirmed that the coverage of the sulfide solid electrolyte layer in the composite active material was improved in Examples 1 to 5 and Comparative Examples 2 to 6, in which a compression shearing treatment was conducted, compared with Comparative Example 1 in which the compression shearing treatment was not conducted.

Also, it was confirmed that the coverage of the sulfide solid electrolyte layer was more improved when the treatment was conducted under decompressed pressure (100 Pa) compared with under an atmospheric pressure if the conditions other than the pressure were the same such as in comparison of Example 1 with Comparative Example 2, Example 2 with Comparative Example 3, Example 3 with Comparative Example 4, Example 4 with Comparative Example 5, and Example 5 with Comparative Example 6.

From the results of Example 1 and Comparative Example 5, if the composite active material with the coverage of 96% is intended, only 40% of the blade rotation speed for the treatment allowed the composite active material to be obtained in Example 1 with under the decompressed pressure, compared with the blade rotation speed in Comparative Example 5 with under an atmospheric pressure. Also, from the results of Example 2 and Comparative Example 6, if the composite active material with the coverage of 97% is intended, only 50% of the blade rotation speed for the treatment allowed the composite active material to be obtained in Example 2 under the pressure below atmospheric pressure, compared with the blade rotation speed in Comparative Example 6 with under an atmospheric pressure. It was confirmed that necessary energy for the treatment was smaller and the treatment efficiency was improved under the pressure below atmospheric pressure compared with under an atmospheric pressure, when adjusting the coverage of the sulfide solid electrolyte layer to be a similar level and conducting the treatment.

REFERENCE SIGNS LIST 1 composite active material
11 oxide active material
12 oxide solid electrolyte layer
13 sulfide solid electrolyte layer
13X sulfide solid electrolyte material
B blade
C vessel

What is claimed is:

1. A method for producing a composite active material having an oxide active material, an oxide solid electrolyte layer that coats a surface of the oxide active material, and a sulfide solid electrolyte layer that coats a surface of the oxide solid electrolyte layer, the method comprising a coating step of forming the sulfide solid electrolyte layer by conducting a mixing treatment such that a sulfide solid electrolyte material is mixed with the oxide active material coated with the oxide solid electrolyte layer while plastically deforming the sulfide solid electrolyte material under a pressure less than an atmospheric pressure, and the sulfide solid electrolyte layer has a specific surface area of 1.06 m$^2$/g or more and 1.22 m$^2$/g or less.

2. The producing method for a composite active material according to claim 1, wherein the pressure less than an atmospheric pressure is 100 Pa or less.

3. The producing method for the composite active material according to claim 1, wherein the mixing treatment while plastically deforming the sulfide solid electrolyte material is a compression shearing treatment using a rotation blade.

4. The method of claim 1, wherein said sulfide solid electrolyte material is mixed with the oxide active material coated with the oxide solid electrolyte layer is by a compression shearing treatment using a rotation blade.

5. The producing method for the composite active material according to claim 3, wherein the compression shearing treatment is a dry treatment.

6. The producing method for the composite active material according to claim 3, wherein a blade rotation speed in the compression shearing treatment is 6 m/s or more and 20 m/s or less.

7. The producing method for the composite active material according to claim 3, wherein a blade rotation speed in the compression shearing treatment is 9 m/s or more and 20 m/s or less.

8. The producing method for the composite active material according to claim 3, wherein a rotation of the blade in the compression shearing treatment is in a range of 500 rpm to 5000 rpm.

9. The producing method for the composite active material according to claim 3, wherein a rotation of the blade in the compression shearing treatment is in a range of 2500 rpm to 3000 rpm.

10. The producing method for the composite active material according to claim 3, wherein a distance between the blade and an inner wall is in a range of 0.1 mm to 8 mm.

11. The producing method for the composite active material according to claim 3, wherein a distance between the blade and an inner wall is in a range of 0.5 mm to 2 mm.

12. The producing method for the composite active material according to claim 3, wherein a treatment time of the compression shearing treatment is 10 minutes or more and 15 minutes or less.

13. The producing method for the composite active material according to claim 3, wherein a blade rotation speed in the compression shearing treatment is 6 m/s or more and 20 m/s or less, a distance between the blade and an inner wall is in a range of 0.1 mm to 8 mm, and a treatment time of the compression shearing treatment is 10 minutes or more and 15 minutes or less.

14. The method for producing the composite active material according to claim 1, wherein a coverage of the sulfide solid electrolyte layer is 95% or more.

15. The method for producing the composite active material according to claim 1, wherein a thickness of the sulfide solid electrolyte layer is 15 nm or more and 25 nm or less.

* * * * *